United States Patent

Snowball

Patent Number: 5,675,153
Date of Patent: Oct. 7, 1997

[54] UV APPARATUS FOR FLUID TREATMENT

[76] Inventor: Malcolm Robert Snowball, Woodside, 4 The Gables, The Plain, Epping, Essex, CM16 6TW, United Kingdom

[21] Appl. No.: 619,625

[22] PCT Filed: Oct. 6, 1994

[86] PCT No.: PCT/GB94/02178

§ 371 Date: Apr. 5, 1996

§ 102(e) Date: Apr. 5, 1996

[87] PCT Pub. No.: WO95/09815

PCT Pub. Date: Apr. 13, 1995

[30] Foreign Application Priority Data

| Oct. 6, 1993 | [GB] | United Kingdom | 9320538 |
| Oct. 6, 1993 | [GB] | United Kingdom | 9320545 |
| Oct. 6, 1993 | [GB] | United Kingdom | 9320546 |
| Nov. 4, 1993 | [GB] | United Kingdom | 9322725 |
| May 27, 1994 | [GB] | United Kingdom | 9410744 |

[51] Int. Cl.$^6$ ............................. C02F 1/32; A61L 2/10
[52] U.S. Cl. ........................ 250/438; 250/437; 250/436
[58] Field of Search .......................... 250/438, 437, 250/436

[56] References Cited

U.S. PATENT DOCUMENTS

| 2,248,618 | 7/1941 | Fischer | 250/438 |
| 4,101,777 | 7/1978 | Reid | 250/436 |
| 4,897,246 | 1/1990 | Peterson | 422/186.3 |
| 5,069,885 | 12/1991 | Ritchie | 422/186 |
| 5,217,607 | 6/1993 | Dalton, III et al. | 210/143 |

FOREIGN PATENT DOCUMENTS

| 0202891 | 11/1986 | European Pat. Off. |
| 1278161 | 10/1961 | France |
| 1916540 | 11/1969 | Germany |
| 2327084 | 12/1974 | Germany |
| 2437110 | 2/1976 | Germany |
| 8804281 | 6/1988 | WIPO |
| 9109673 | 7/1991 | WIPO |

*Primary Examiner*—Jack I. Berman
*Attorney, Agent, or Firm*—Edwin D. Schindler

[57] ABSTRACT

A water sterilization system comprises an electrostatic water treatment apparatus (10) having its outer duct (13) connected to an ultraviolet treatment apparatus (11). The outlet duct (14) of the ultraviolet water treatment apparatus (11) is connected to an apparatus (12) which aerates the treated water with ozone gas. The electrostatic field of the apparatus (10) varies along the axis of the flow duct, so as to increase the speed at which dissolved minerals precipitate out of solution. The ultraviolet treatment apparatus (11) has a slotted helical guide vane, which creates a turbulent flow of water and ensures that large clumps of microorganisms are broken up. The ozone gas is generated in an apparatus (15) by exposing water vapor and air to shortwave UV radiation.

15 Claims, 7 Drawing Sheets

UV APPARATUS FOR FLUID TREATMENT

This invention relates to fluid treatment and more particularly but not solely to a system for sterilising water or sewage.

Untreated sewage is often pumped into the sea and rivers. This sewage may contain harmful micro-organisms and bacteria such as hepatitis, which can pass into the food chain and which can also be passed on to people who come into contact with the polluted water.

It is well known that high-intensity ultra-violet (UV) light has germicidal properties which can be used to sterilise water. Water treatment companies are reluctant to utilise UV sterilisers because they do not effectively treat all of the water. This occurs because conventional ultra-violet (UV) light fluid treatment apparatus only operate effectively if the fluid being treated is optically clear. For example, if the fluid being treated is cloudy or of high turbidity, the UV light is substantially attenuated away from the close proximity of the light source, thus clumps of microbes which do not come within close proximity of the UV light source do not receive a dose of UV radiation which is sufficient to kill them. Furthermore, microbes tend to collect in clumps, thus microbes at the centre of the clumps are shaded from the UV light by the microbes on the outside of the clump.

We have now devised a fluid treatment apparatus which alleviates the above-mentioned problems.

In accordance with this invention, as seen from a first aspect, there is provided a fluid treatment apparatus comprising an elongate tubular duct having inlet and outlet ports at or adjacent its opposite ends, an elongate light source extending along the axis of the duct and a guide vane extending helically along the internal wall of the duct between the input and output ducts, apertures being formed in the guide vane for communicating between adjacent turns of the fluid flow passage defined by the vane.

In use, fluid to be treated flows through the duct from the inlet port to the outlet port along the helical passage. This helical flow generates controlled turbulence which ensures that all of the water or other fluid being treated comes within close proximity of the light source during treatment. Fluid flowing along the passage is able to pass through the apertures between adjacent turns of the helical passage. As clumps of microbes pass through the apertures, they are broken up into individual microbes which can be treated more effectively.

Preferably the apertures in the guide vane comprise radially extending slots so that fluid flowing through these slots is not shaded from the light source.

Preferably a second fluid flow passage extends axially along the duct between the light source and the radially inner edge of the guide vane. The fluid flows of the two passages interfere to produce a swirling flow of fluid which moves helically along the duct. This swirling action further increases the turbulence inside the duct, moving the water in a controlled double helix action.

Preferably substantially longitudinally extending vanes are disposed on the internal wall of the duct to promote the flow of fluid through the apertures in the helical guide vane.

Preferably the helical guide vane is formed by cutting a series of slots along a helical line on the wall of the duct and inserting individual segments of the vane into each slot in the wall.

Preferably the individual vane segments are pre-shaped prior to insertion, so that when assembled the segments define a helix.

Another disadvantage with conventional UV light fluid treatment apparatus is that they have to be cleaned regularly in order to remove slime and other waste matter which has built up in front of the UV lamp. Usually the UV lamp is separated by a glass wall from the fluid, and thus it has been proposed to provide wiping mechanisms which automatically clean the glass. These wiping mechanisms are complicated and difficult to maintain.

It has also been proposed to provide a wall formed from polytetrafluoroethylene (PTFE) to separate the UV lamp from the sewage. PTFE has non-stick properties which inhibit the build up of slime and waste matter in front of the UV lamp. PTFE partially transmits UV light at the wavelengths (245–265 nM) which are germicidal, however a large proportion of the UV light is absorbed by the PTFE. This absorption of UV light can be reduced by reducing the wall thickness. However, PTFE is a flexible material, thus the wall needs to be thick in order to withstand the high pressure within the fluid treatment chamber. Thus, in accordance with this invention as seen from a second aspect, there is provided a fluid treatment apparatus comprising a flow passage for the fluid to be treated, and a light source for directing light at the fluid in said flow passage through a transparent wall, the transparent wall being separated from the fluid by a layer of a relatively adherence-resistant material supported by the transparent wall.

The layer of relatively adherence-resistant or non-stick material prevents slime and waste matter from building up on the transparent wall. Preferably the transparent wall is itself sufficiently rigid to be able to withstand the fluid pressure in the flow passage. The transparent wall may comprise a glass material. Preferably the glass material is a quartz glass, which is extremely rigid, so that the wall thickness can be minimised in order to reduce absorption of the light by the glass.

Preferably the layer of non-stick material is applied to the transparent wall by spraying.

Preferably the light source is mounted inside a transparent sleeve which extends through the fluid flow passage.

The layer of non-stick material may be applied to the transparent sleeve by fitting a tube of the non-stick material over the transparent sleeve.

Preferably the tube of non-stick material comprises a heat-shrinkable tube which is recovered onto the sleeve.

Preferably vanes are provided inside the fluid flow passage for causing a turbulent fluid flow. This turbulent flow of fluid creates a scrubbing action which removes any matter which may have built up on the surface of the non-stick layer.

Preferably the non-stick layer is 15–150 nM in thickness. The non-stick layer preferably comprises PTFE.

Water can contain salts and minerals such as calcium carbonate, magnesium and iron compounds in solution. These salt and minerals can precipitate out of solution and can build up as deposits on the walls of pipes and tanks etc. This so called hard water can be treated in a variety of ways in order to reduce the quantity of salts and minerals deposited on the walls of pipes and tanks etc. One type of water softener comprises a device which sets up a magnetic or electrostatic field which acts on the dissolved salts and minerals by preventing them from forming regular crystalline lattice structures, so that they precipitate out as a soft sludge rather than as the normal hard close-packed scale. The sludge also combines with existing scale to form large molecules of softer scale which break away, and which can be filtered out of the water.

As stated above, it has been proposed to use an electrostatic field to treat hard water, however conventional electrostatic water treatment apparatus have hitherto suffered from various drawbacks and have not worked efficiently. Thus, in accordance with this invention as seen from a third aspect, there is provided a fluid treatment apparatus comprising a duct for flow of the fluid and means for applying an electrostatic field to the duct, wherein the intensity of the field varies along the length of the flow duct.

The speed at which salts and minerals precipitate out of solution in water is greatly increased if it is subjected to a varying electrostatic field.

Preferably the electrostatic field is set up between two spaced apart electrodes.

Preferably the apparatus comprises a tubular outer electrode with an inner electrode extending along its axis. Preferably the outer electrode forms a sidewall of the duct.

In use, a high voltage is applied across the two electrodes so that a radially extending electrostatic field is set up. Thus, all of the water flowing through the duct is subjected to the electrostatic field.

Preferably one of the electrodes is insulated from the fluid, so that the fluid cannot provide a conductive path between the two electrodes.

Preferably the density of the electrostatic field is varied by varying the spacing between the two electrodes. Preferably the surface of the inner electrode is profiled so that the radial distance between the electrodes varies along the length of the flow duct. Alternatively the inner surface of the outer electrode may be profiled.

Preferably the profiled electrode surface gives an electrostatic field which fluctuates in density along the length of the flow duct. Preferably the fluctuating electrostatic field is provided by annular ridges or grooves formed on the electrode surface.

It is well known that magnetic fields have a similar effect on water as electrostatic fields, however a disadvantage with known types of magnetic water softeners is that they only affect dissolved minerals at points where the magnetic field extends perpendicular to the flow of water. Thus, if a coil or bar magnet is used, the affect only occurs at each end of the magnet or coil. Hitherto, magnetic water softeners have been relatively inefficient. Thus, in accordance with this invention, as seen from a fourth aspect, there is provided a fluid treatment apparatus comprising a fluid flow duct and means for setting up a transverse magnetic field across the duct, wherein the direction of the field varies along the length of the duct.

Fluid flowing along the duct is thus exposed to a magnetic field which extends perpendicular to the direction of flow. Salts and minerals dissolved in the fluid thus precipitate out of solution. The effect is accelerated owing to the varying direction of the magnetic field along the axis of the duct: this causes the particles in the fluid to spin.

Preferably the direction of the magnetic field varies through at least 360° along the axis of the tube.

Preferably the apparatus comprises oppositely poled pairs of magnets arranged on diametrically opposite sides of the duct, a plurality of such pairs of magnets being arranged along the axis of the duct, and the direction of the magnetic field produced by each pair of magnetics being offset from the field of adjacent magnets.

Preferably the magnets comprise electromagnets. The walls of the duct are preferably formed from a non-magnetic material e.g. stainless steel.

Preferably successive pairs of magnets are offset from adjacent pairs of magnets by less than 90°, so that the direction of the magnetic field spirals along the axis of the duct.

A disadvantage with electrostatic and magnetic fluid treatment apparatus is that they are ineffective at killing micro-organisms and bacteria. Thus, in accordance with this invention, as seen from a fifth aspect, there is provided a fluid system comprising a fluid flow duct, field generating means for applying an electrostatic and/or electromagnetic field to fluid in the duct, and an ultra-violet light source for directing UV light at the fluid in the duct downstream of said electrostatic and/or electromagnetic field.

In use, a synergistic biological kill effect occurs when the fluid is exposed to an electrostatic and/or electromagnetic field prior to exposing it to UV light. This effect is thought to occur because the electrostatic and/or electromagnetic field interferes with the micro-organisms' membrane or cell wall, such that their ability to absorb nutrients is impaired: this considerably weakens the microorganisms and makes them more susceptible to UV radiation.

It is well known that ozone ($O_3$), like chlorine, has sterilising properties. Ozone is produced in the atmosphere by the action of ultra-violet light on oxygen ($O_2$) in the air. However, ozone can also be produced artificially by creating an electrical corona discharge in dry gaseous oxygen. This corona discharge contains sufficient energy to break the co-valent oxygen bonds, so that free oxygen (O) radicals are formed. These free oxygen radicals recombine to form so-called activated ozone. This activated ozone can be used as an oxidising agent. A disadvantage of this corona discharge technique is that the efficiency is poor when considering the amount of energy used to create a specific amount of oxidising gas. Another disadvantage is that the corona discharge generates radio interference which needs to be suppressed. Thus, in accordance with this invention, as seen from a sixth aspect, there is provided an apparatus for producing an oxidising gas comprising inputs for respectively receiving air or oxygen and water, means for vaporising the water in the air or oxygen and means for exposing the vapour to short wave ultra-violet (UV) radiation.

The short wave UV radiation contains sufficient energy to break the oxygen-oxygen and oxygen-hydrogen bonds in the water and to form hydrogen free radicals, hydroxyls and ozone. The resultant gas therefore comprises hydrogen (H) and hydroxyl (HO) free radicals and ozone ($O_3$). This gas is consequently highly oxidising.

Preferably the short wave UV radiation has a wavelength of 100–200 nM.

The means for exposing the vapour to short wave UV radiation preferably comprises a mercury arc discharge lamp tuned to output substantially all of its radiation at 100–200 nM. Low pressure mercury arc lamps typically generate substantially all of their radiation at the bottom end of the UV spectrum i.e. 254 nM, and very little short wave UV radiation. The output of mercury arc UV lamps is adversely affected by lamp skin temperature. The wavelength of the UV radiation falls as the lamp skin temperature increases. Therefore the wavelength of the generated radiation can be tuned by controlling the lamp skin temperature. Preferably the lamp is tuned by heating the vapour so that it raises the temperature of the lamp's skin. The heating of the vapour also raises its humidity so that more water is exposed to the UV radiation.

Preferably the lamp is driven by a current which is greater than its specified operating current in order to raise its operating temperature. Thus, the combination of the heating effect caused by the water vapour and the high operating current causes the lamp to output substantially all of its radiation at 184 nM.

Preferably the mercury discharge tube extends axially along a flow duct having inlet and outlet ducts at its opposite ends.

As stated above, it is well known that ozone ($O_3$) has sterilising properties, which acts by oxidising the cell walls or membranes of micro-organisms which are exposed to the ozone for a sufficiently long time i.e. 2-10 minutes. However, unlike chlorine, which is a stable chemical, ozone will only remain active for about 25 minutes in water. Thus, if the ozone has not contacted a micro-organism in this time it is ineffective. For this reason conventional ozone water treatment apparatus are more suitable for recirculating type systems. Thus, in accordance with this invention, as seen from a seventh aspect, there is provided a fluid treatment system comprising a fluid flow duct, an ultra-violet light source for directing UV light at fluid in the duct, and means for introducing an oxidising gas into the fluid downstream of the UV light source.

In use, a synergistic effect occurs from a biological and oxidisation point of view, which results in an enhanced biological kill and an enhanced ability to break the bonds of chemicals in the fluid.

An extremely effective fluid treatment system is formed when the fluid is exposed to an electrostatic and/or electro-magnetic field, then UV light before being aerated with an oxidising gas such as ozone. The latter also leaves a short-lived residual disinfection action in the fluid.

A synergistic bond breaking and oxidisation effect is produced by the combination of these three treatments. The electrostatic and/or electromagnetic field starts the precipitation out of solution of some dissolved solids. The UV steriliser contributes to the chemical reaction by breaking chemical bonds, and the ozone generator carries on breaking bonds and oxidising any chemicals in the fluid. The net result is an extremely effective biological disinfector together with an effective pollution removal system e.g. for water and effluent.

Areas involved with the preparation of food require a temperature controlled environment. This is normally achieved by blowing chilled air around the area. The air in generally re-circulated and this becomes increasingly contaminated with micro-organisms. Hot-air type hand driers have a similar problem with re-circulating germs. Thus, in accordance with this invention, as seen from an eighth aspect, there is provided an air sterilisation apparatus comprising fan means for causing a flow of air, and irradiating means for irradiating the flow of air with ultra-violet radiation.

The ultra-violet radiation, thus acts to sterilise the flow of air through the fan. Thus, in food preparation areas the re-circulated air can be drawn through the system, so as to kill all of the micro-organisms.

In hand-driers the source of UV radiation can be placed in front or behind the internal fan, so that the hot air from the drier is sterilised. The hand-drier may incorporate means for periodically actuating the fan and irradiating means, in order to ventilate the room in which the drier is situated with sterilised air: this helps to keep the levels of micro-organism contamination down e.g. in public lavatories.

In biologically sensitive processes where enclosed tanks are filled and emptied of air, it is important that air flowing from the tank is biologically clean. This can be achieved by connecting an air sterilisation system in accordance with this invention to the vent duct of the tank.

Preferably the UV radiation has a wavelength of predominantly 245-265 nM, and particularly 253.7 nM. UV radiation at 253.7 nM is particularly useful in converting ozone in ozone contaminated air into oxygen.

Embodiments of this invention will now be described by way of examples only and with reference to the accompanying drawings, in which.

Figure 1:
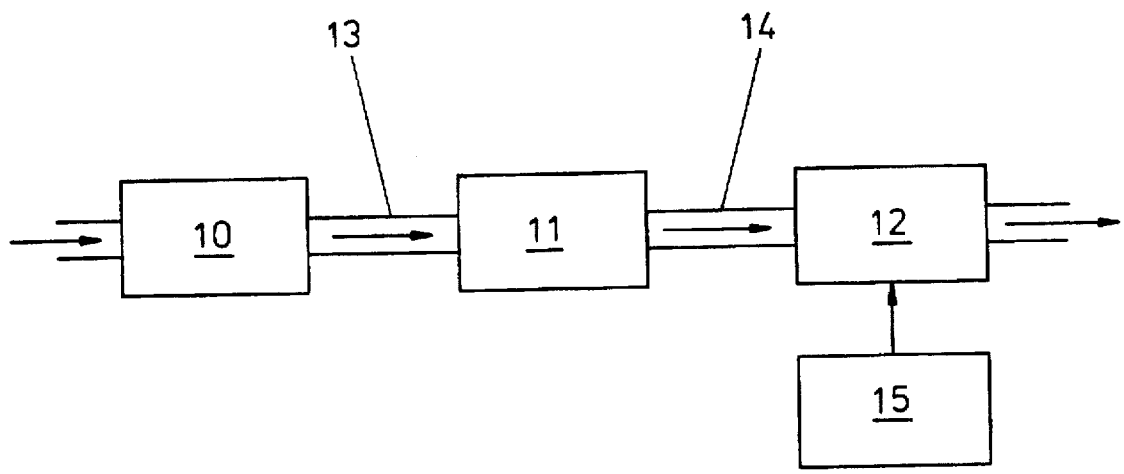
FIG. 1 is a block diagram of an embodiment of water treatment system in accordance with this invention.

Referring to FIG. 1 of the drawings there is shown a water treatment system comprising an electrostatic water treatment apparatus 10 connected by a duct 13 to an ultra-violet (UV) light water treatment apparatus 11. The UV light water treatment apparatus 11 is connected by a duct 14 to an apparatus 12 which aerates water in the duct with oxidising gas generated by a generator 15.

In use, water flows through the electrostatic water treatment apparatus 10, through the duct 13 and into and through the UV light water treatment apparatus 11. Water leaving the apparatus 11 through the duct 14 is aerated with oxidising gas from the generator 12.

Figure 2:
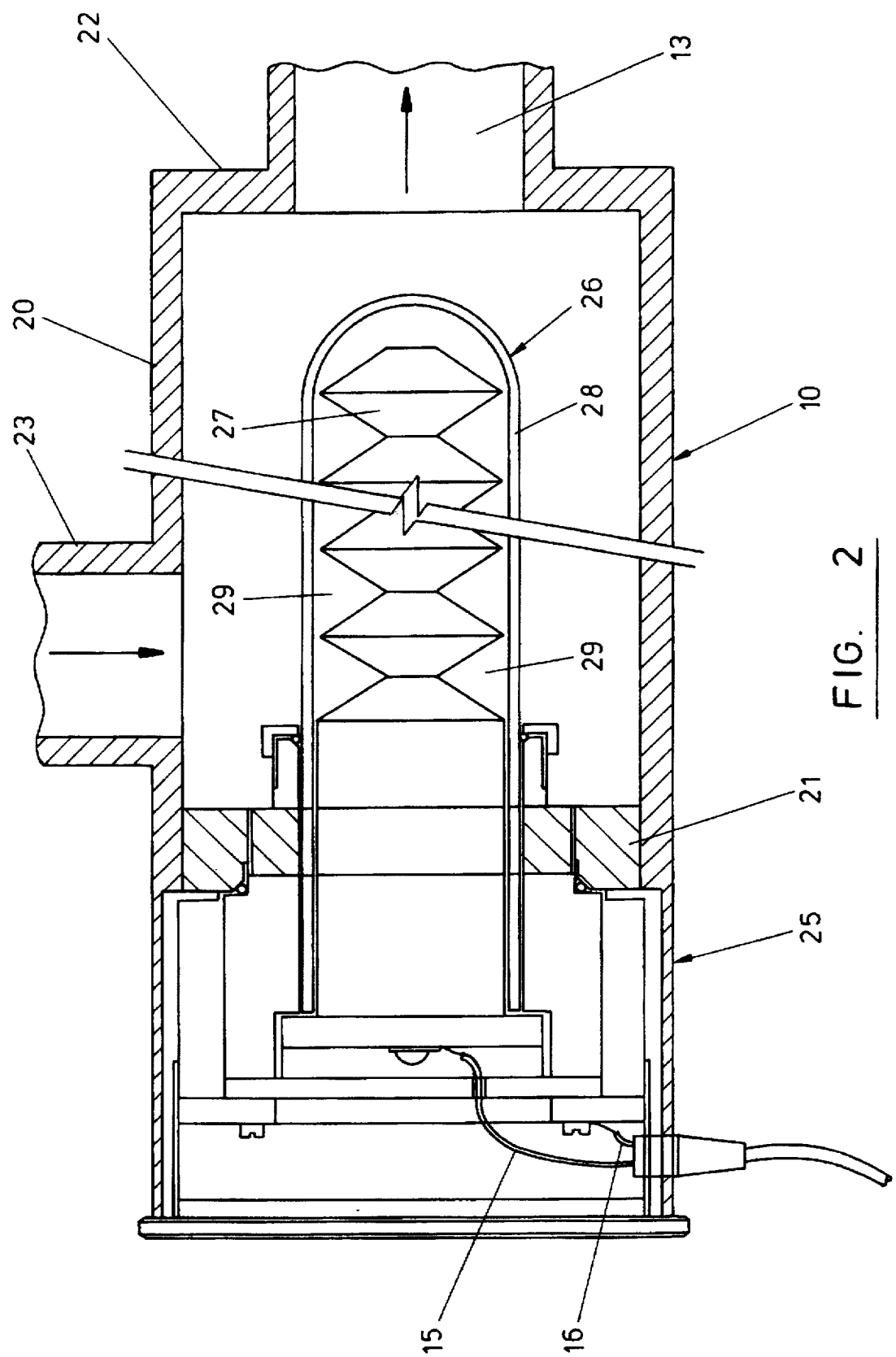
FIG. 2 is a sectional view through an electrostatic water treatment apparatus of the system of FIG. 1.

Referring to FIG. 2 of the drawings, the electrostatic water treatment apparatus 10 comprises a tubular duct 20 formed from an electrically conductive material. The duct 20 is closed at its opposite ends by end walls 21, 22. An inlet port 23 projects radially from the duct 20 adjacent one end. An outlet duct 13 connected to the UV light water treatment apparatus 11, projects axially from the end wall 22 at the opposite end of the duct 20. A cylindrical probe assembly 25 is inserted inside the free end of the tubular duct 20 as an interference fit. An elongate probe 26 projects from the assembly 25 through an aperture in the end wall 21. The probe 26 comprises an elongate metal electrode 27 sealed inside a thin walled glass insulating sleeve 28. Glass is used as an insulator rather than plastics because plastics tends to deteriorate over a period of time. The electrode 27 may be withdrawn from the sleeve 28 without draining any water from the apparatus.

The electrode 27 has a series of V-shaped annular slots 29 formed along its length. The probe 26 is supported by the assembly 25 in such a way that it is insulated from the duct 20. A supply cable carries wires 15, 16 which enter the probe assembly 25 and which connect to the inner electrodes 27 and to the duct 20 (which forms an outer electrode) respectively.

Figure 3:
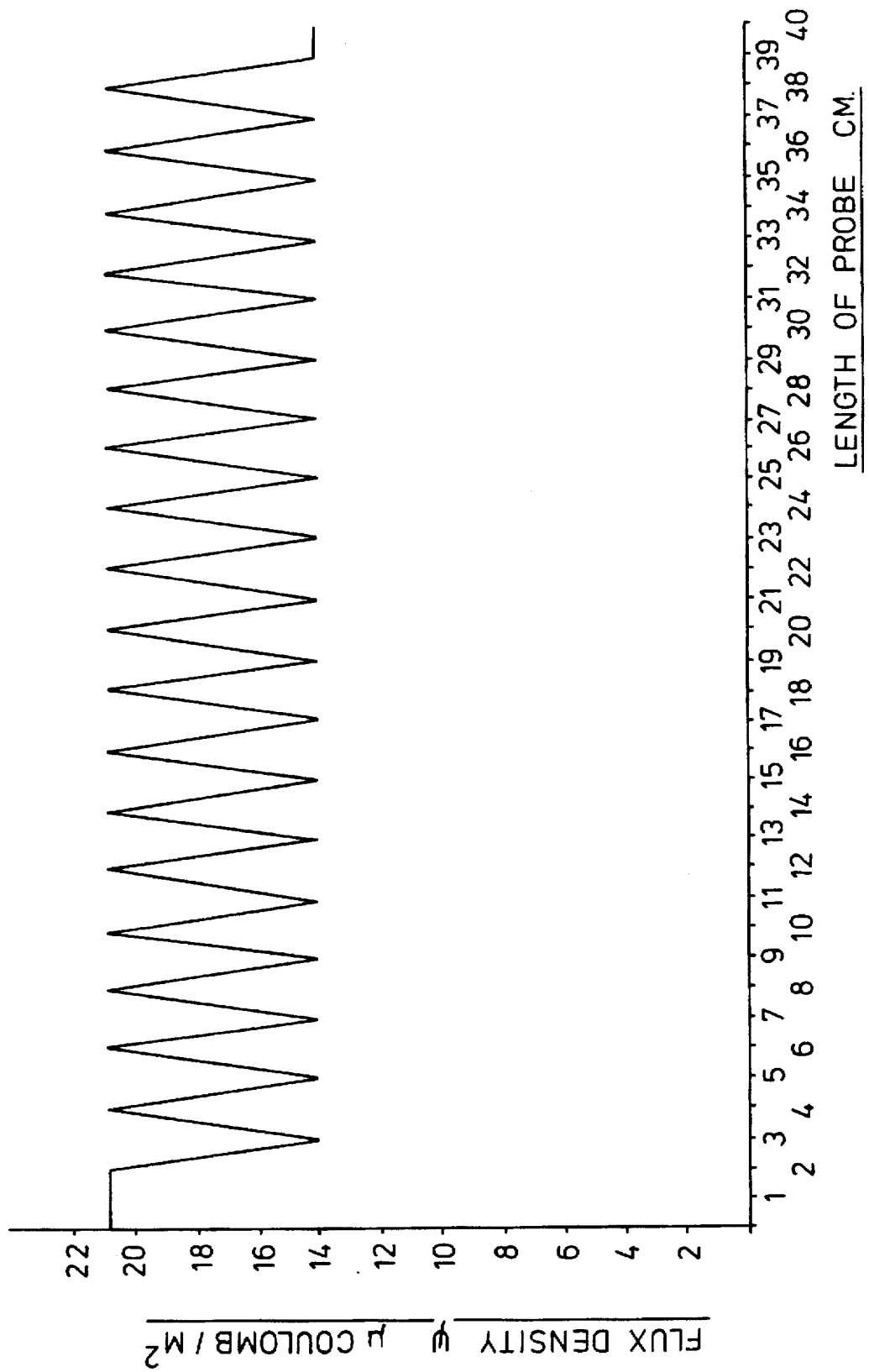
FIG. 3 is a graph showing the variation of flux density along the length of the apparatus of FIG. 2.

In use, the wires 15, 16 are connected to the positive and negative terminals respectively of a 10 KV-20 KV supply. The high voltage supply sets up an electrostatic field which extends radially between the inner and outer electrodes. Referring to FIG. 3, the V-shaped slots 29 on the inner electrode cause the flux density of the electrostatic field to vary along the length of the duct. Water flowing through the duct is subjected to the varying electrostatic field thereby causing salts and minerals to precipitate out of solution in the form of a soft sludge. The varying electrostatic field causes the precipitation process to be greatly speeded up.

In an alternative embodiment the probe may comprise an electrode coated with glass e.g. using electrophoresis or vitreous enamelling.

Figure 5:
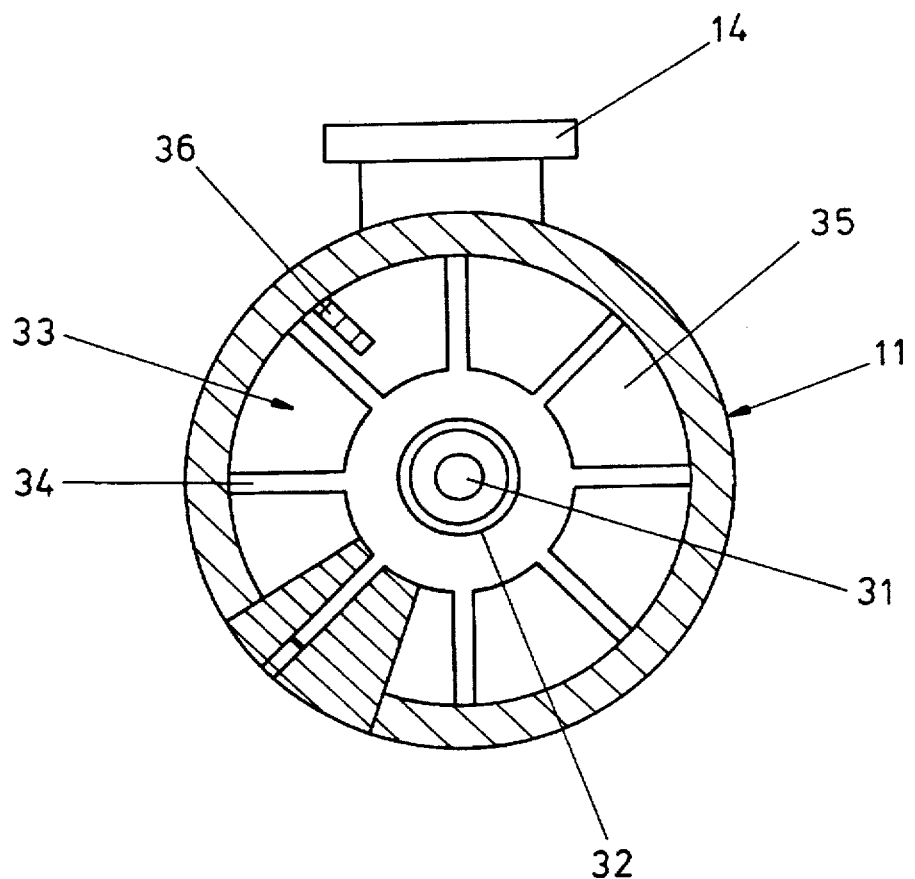
FIG. 5 is a sectional view along the line V—V of FIG. 4.
Figure 4:
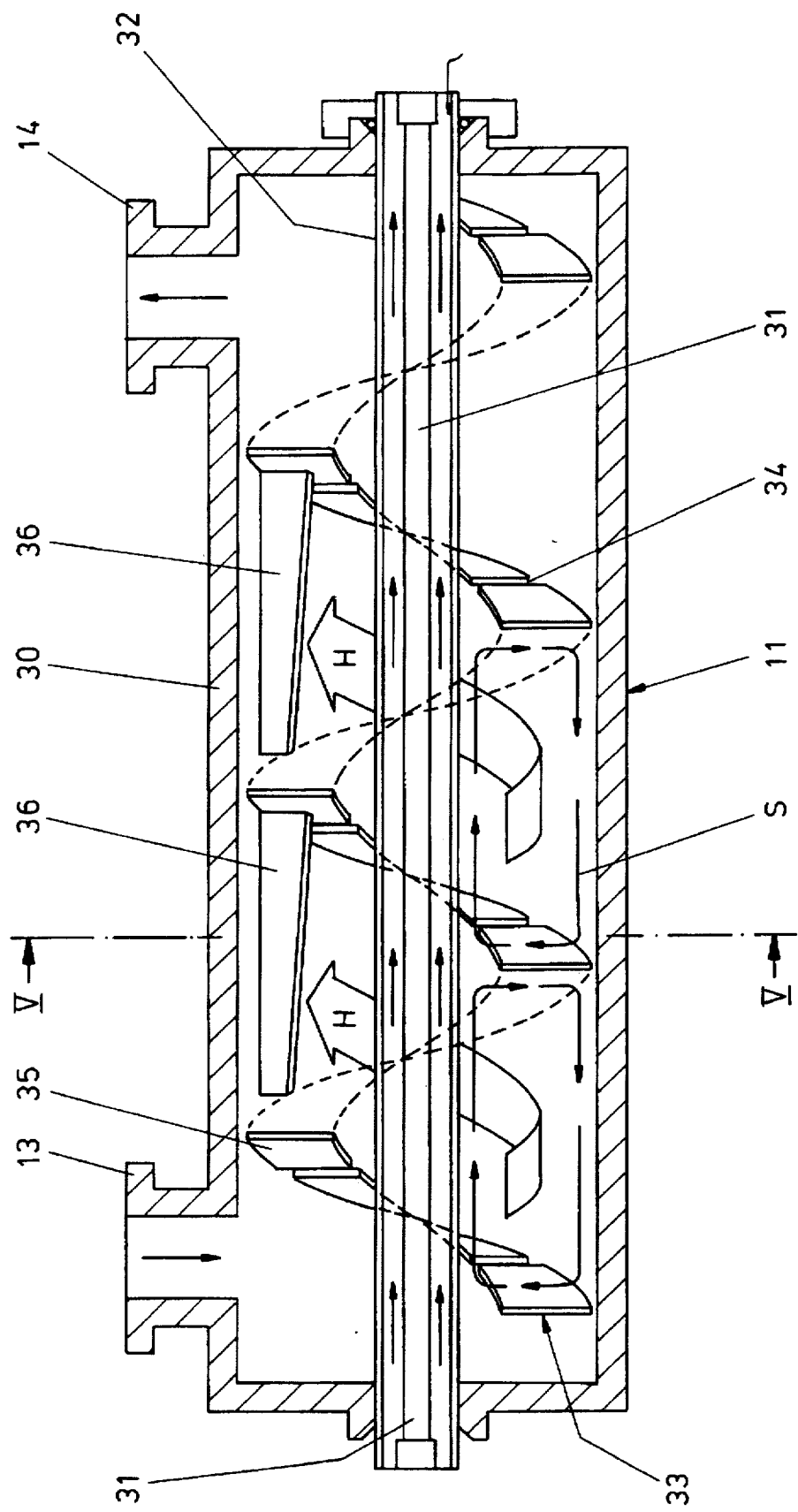
FIG. 4 is a longitudinal sectional view through an embodiment of ultra-violet water treatment apparatus of the system of FIG.1.

Water flowing from the outer duct 13 of the electrostatic water treatment apparatus 10 enters the UV light water treatment apparatus 11. Referring to FIGS. 4 and 5, the UV light water treatment apparatus 11 comprises an elongate tubular duct 30 formed from stainless steel and having inlet and outlet ducts 13, 14 mounted to its opposite ends. An elongate ultra-violet lamp 31 is mounted inside a quartz glass sleeve 32 which extends along the axis of the duct 30. The sleeve 32 is sealed at its opposite ends to the end-walls of the tubular duct 30, so that in use the water being treated is isolated from the surface of the lamp 31.

A guide vane 33 is disposed on the internal wall of the duct 30 to direct the water flowing through the apparatus. The guide vane 33 comprises a radially inwardly projecting wall wound helically around the internal wall of the duct between the inlet and outlet ducts 13, 14. Slots 34 are formed radially in the guide vane 33 at regular intervals along its length. The slots 34 are preferably 5 mm wide.

The guide vane 33 is formed by machining a series of slots along a helical line on the wall of the duct 30. Small rectangular pieces of metal, cut to the same length as the slots, are then precisely twisted at their opposite ends to form segments 35 of the vane. The grain of the pieces of metal used to form the segments 35 encourages the pieces to adopt the correct shape. The shaped pieces of metal are then inserted into the slots cut in the wall of the duct 30, and they are then welded in place. The radially inner edge of the guide vane 33 is spaced from the outer surface of the quartz glass sleeve 32 which extends parallel to the axis of the duct 30.

A plurality of elongate vanes 36 are mounted axially on the internal wall of the duct 30. The downstream end of each elongate vane 36 converges towards the helical guide vane 33 adjacent one of its slots 34.

In use, water flows along the duct 30 from the inlet duct 13 to the outlet duct 14. The guide vane 33 acts primarily to channel the water helically around the UV lamp 31. However, a column of water also tends to flow axially along the duct in the space between the inner edge of the guide vane 33 and the outer surface of the quartz glass sleeve 32. These two flows of water interact to product a swirling flow S which moves helically along the duct as shown by arrows H. This double helix flow of water ensures that all of the water flowing through the duct 30 comes within close proximity of the UV lamp 31 at some time during its passage through the apparatus. Thus, all of the bacteria or microbes in the water receive lethal doses of UV radiation from the lamp 31.

Further, the centrifugal action of the swirling water forces any large clumps of microbes or bacteria to the outside of the swirling flow S. The slots 34 in the guide vane 33 allow a small amount of water to flow between adjacent turns of the helical flow passage. This causes microbes and bacteria on the outside of the swirling flow to be forced through the slots 34. The vanes 36 act to promote the flow of water through the slots 34. As the clumps of microbes and bacteria move from the high pressure zone on one side of the slot 34 to the low pressure zone on the other side of the slot, they are broken up into individual bacteria and microbes. Dispersal in this manner prevents microbes being shielded from the UV light by other microbes. Slots 34 are used in the vane 33, as opposed to apertures, so that there is not shading from UV light inside the duct.

Figure 6:
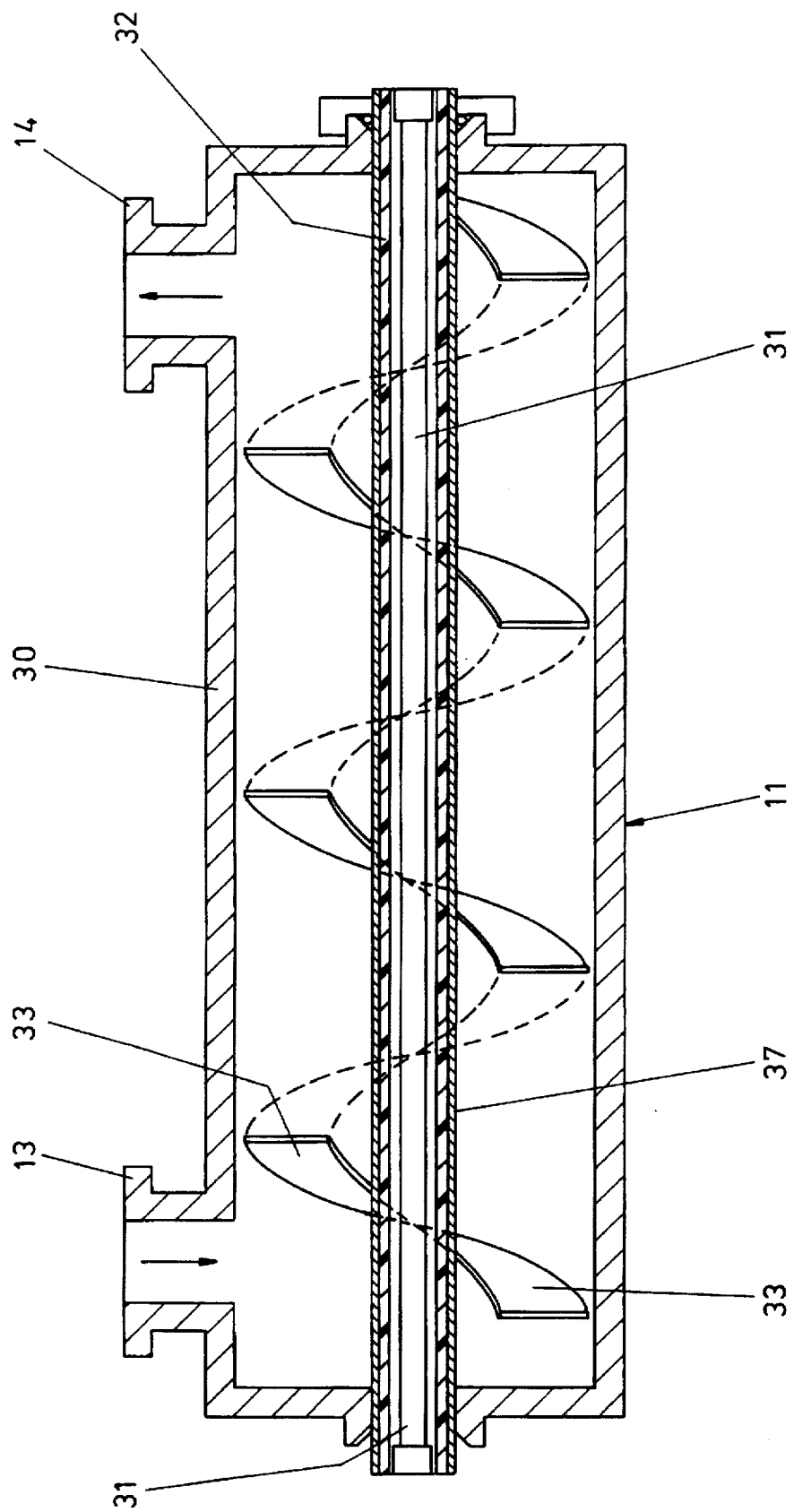
FIG. 6 is a longitudinal sectional view through an alternative embodiment of ultra-violet water treatment apparatus of the system of FIG. 1.

Referring to FIG. 6, there is shown an alternative embodiment of UV light water treatment apparatus, and like parts are given like reference numerals. In this embodiment the quartz glass sleeve 32 is coated with a layer of PTFE 37, which isolates the water being treated from the surface of the glass sleeve 32.

In use, water flows along the duct 30 between the inlet and outlet ducts 13, 14. The turbulent flow of water creates a scrubbing action which removes any matter which may be built up on the coated surface of the sleeve. The emitted light kills micro-organisms in the water so that it can be safely pumped into the sea or rivers. Furthermore, the PTFE layer 37 prevents iron or manganese in the water from reacting with the quartz glass sleeve 32. Such a reaction would reduce the transparency of the quartz glass sleeve.

Figure 7:
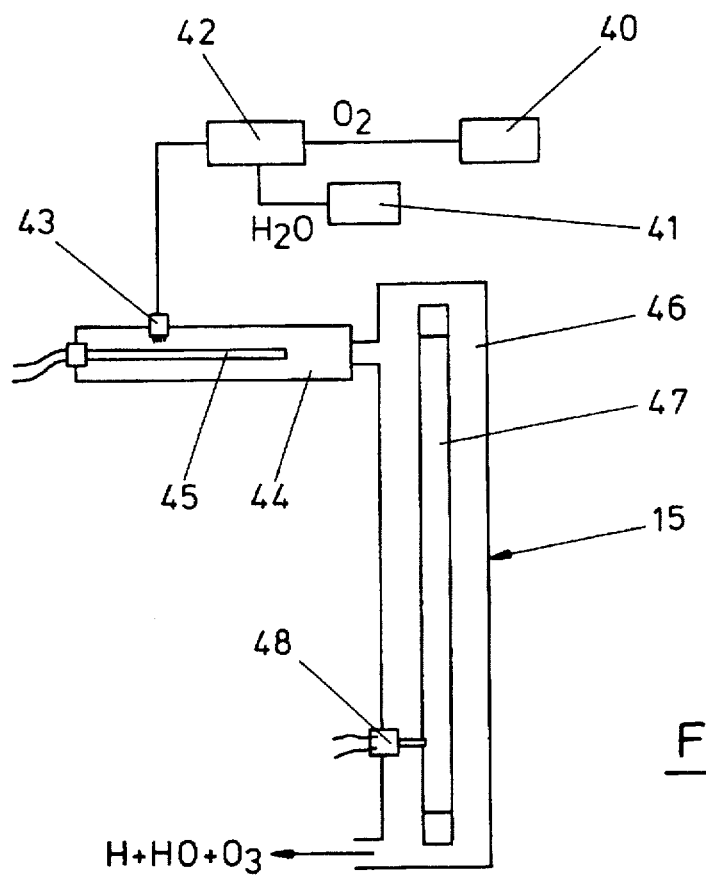
FIG. 7 is a block diagram of an oxidising gas generator of the system of FIG. 1.

The outlet duct 14 from the UV light water treatment apparatus 11 is connected to the apparatus 12 which aerates the water with oxidising gas. Referring to FIG. 7 the oxidising gas generator 15 comprises a source of air 40 and a source of water 41. The air and water are mixed in an atomising chamber 42 to produce humidified air, which is fed through a nozzle 43 into a manifold 44. The manifold 44 comprises a heating element 45 which heats the air in order to increase its humidity. The humidified air is fed into an elongate tubular chamber 46 having a mercury arc UV lamp 47 extending along its axis.

The lamp 47 is driven by current which is greater than its specified operating current, to raise its skin temperature.

Figure 8:
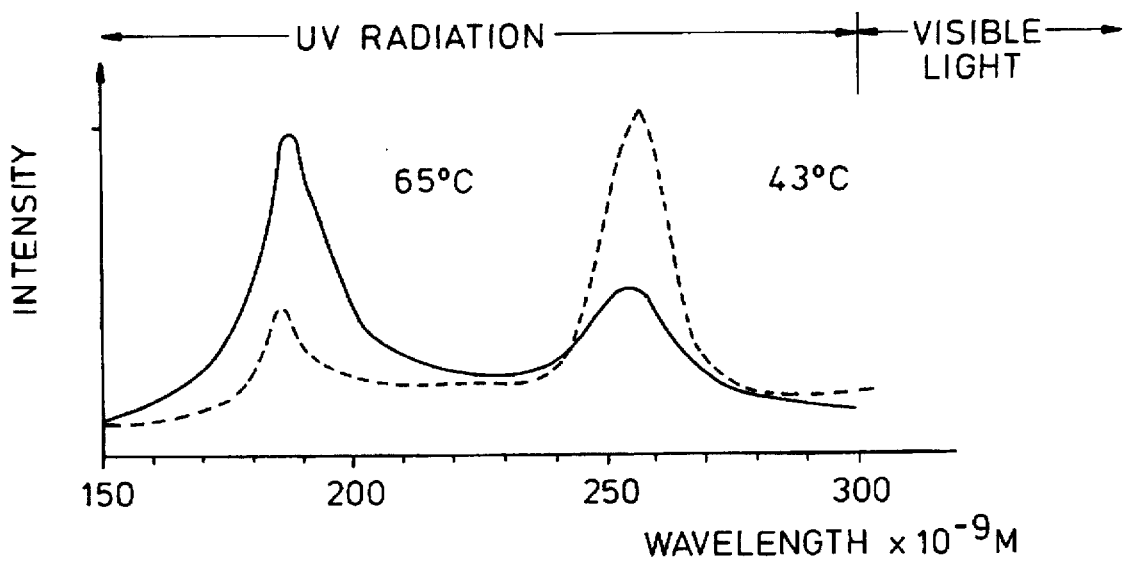
FIG. 8 is a graph of intensity against wavelength for a mercury arc discharge lamp.

Referring to FIG. 8, with a cold spot temperature of 45° C. the UV lamp 47 outputs substantially all of its radiation at 254 nM and very little at 184 nM. However, as the heated humidified air flows around the UV lamp 47, its cold spot is raised to 65°–70° C. At this temperature the UV lamp outputs substantially all of its radiation at 184 nM and very little at 254 nM. A thermostat 48 controls the temperature of the heating element and/or the lamp current so that the lamp skin temperature is maintained at a constant level.

The emitted short wave UV radiation breaks the co-valent bonds of the oxygen ($O_2$) in the air. However, it also contains sufficient energy to break the oxygen-hydrogen bond in the water, so that hydrogen (H) and hydroxyl (HO) free radicals are formed. The energy required to break the oxygen-hydrogen bond is 117.5 Kcal/gmol whereas the energy output from the UV lamp at 185 nM is 154.5 K cal/gmol.

The resultant gas emerging from the chamber 46 comprises hydrogen and hydroxyl free radicals, air and ozone. This gas is consequently highly oxidising owing to the ozone and the free radicals. The gas is connected to the apparatus 12 which aerates water in the duct.

The combined effect of the three apparatus connected as shown in FIG. 1 create a synergistic biological kill effect together with an enhanced ability to destroy chemical contaminants and remove dissolved solids.

Figure 9:
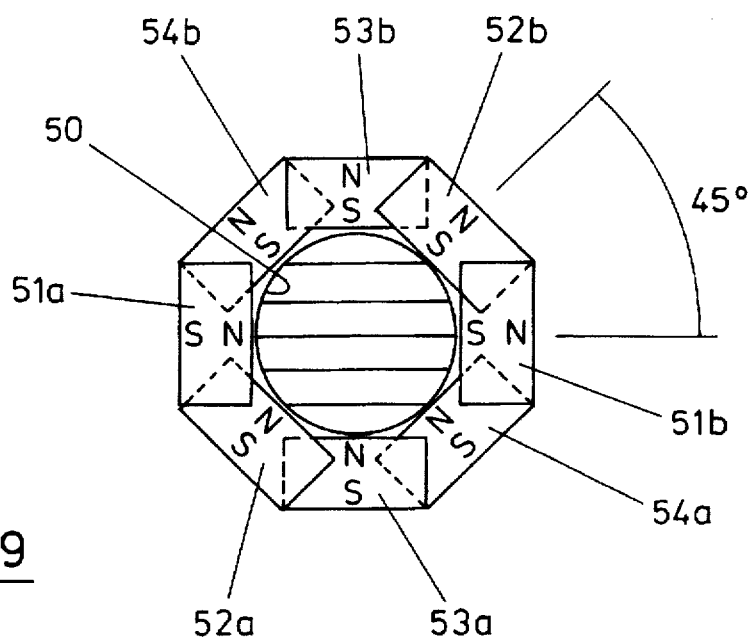
FIG. 9 is a sectional view through a magnetic water treatment apparatus for use in an alternative embodiment of the system of FIG. 1.

Referring to FIG. 9, there is shown a circular-section fluid flow duct 50 formed from non-magnetic stainless steel. A pair of electromagnets 51a, 51b are attached to diametrically opposite portions of the duct 50. The electromagnets 51a, 51b comprise soft-iron cores welded to the outside surface of the duct 50.

A plurality of such electromagnets (52, 53, 54), offset by 45°, are arranged in pairs at intervals along the axis of the duct 50.

Figure 10:
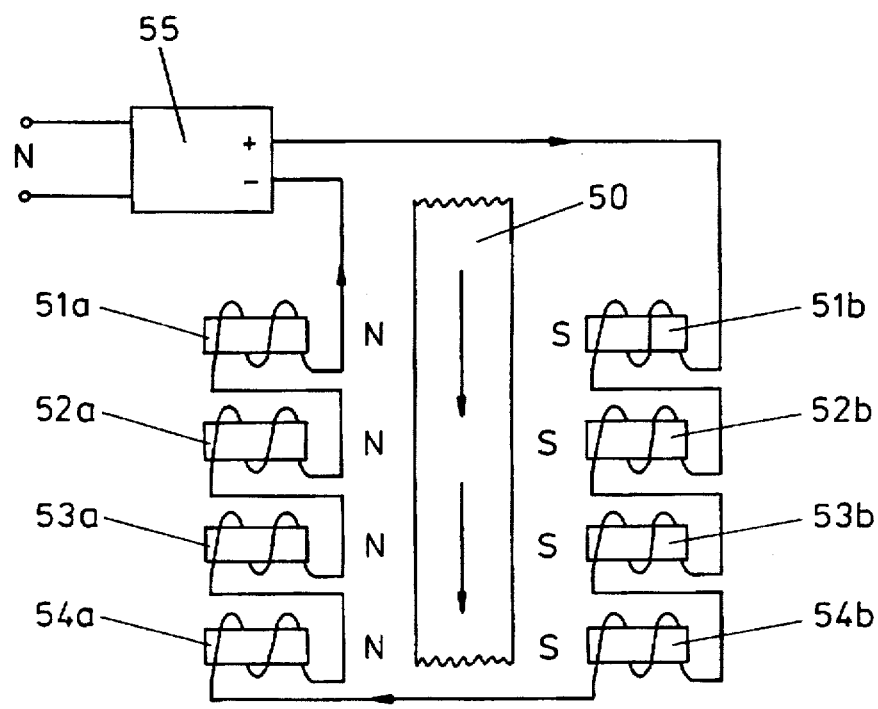
FIG. 10 is a schematic diagram of the magnetic water treatment apparatus of FIG. 9.

Referring to FIG. 10, the electromagnets (51, 52, 53, 54) are connected to a mains powered D.C. supply 55. The coils are connected in series such that N-S fields are set up between opposite electromagnets e.g. 51a, 51b.

Thus, water flowing axially along the duct 50 is exposed to a magnetic field which effectively rotates through 360° from end-to-end of the apparatus. This rotation causes particles in the water to spin, thereby giving an accelerated precipitation out of solution of salts and minerals in the water.

I claim:

1. A fluid treatment apparatus, comprising:
   an elongate tubular duct having an inlet port and an outlet port at, or adjacent to, its opposite ends;
   an elongate light source extending along an axis of said elongate tubular duct; and,
   a guide vane extending helically along an internal wall of the elongate tubular duct between input and output ducts, with apertures being formed in the guide vane for communicating between adjacent turns of fluid flow passage defined by the guide vane.

2. The fluid treatment apparatus according to claim 1, wherein the apertures in the guide vane comprise radially extending slots.

3. The fluid treatment apparatus according to claim 1, further comprising a second fluid flow passage extending axially along the duct between the light sources and a radially inner edge of the guide vane.

4. The fluid treatment apparatus according to claim 1, further comprising substantially longitudinally extending vanes disposed on the internal wall of the duct and arranged for promoting the flow of fluid through the apertures in the guide vane.

5. The fluid treatment apparatus according to claim 1, wherein said guide vane comprises a plurality of individual vane segments inserted into respective ones of a series of slots formed along a helical line on the wall of the duct.

6. The fluid treatment apparatus according to claim 5, wherein the individual vane segments are pre-shaped prior to insertion so that, when assembled, the segments define a helix.

7. The fluid treatment apparatus according to claim 1, further comprising a transparent wall disposed between the light source and the duct, the transparent wall being separated from the fluid in said duct by a layer of a relatively adherence-resistant material support by the transparent wall, the guide vane being arranged for causing a turbulent flow of fluid inside the duct over said layer.

8. The fluid treatment apparatus according to claim 7, wherein the transparent wall comprises a glass material.

9. The fluid treatment apparatus according to claim 8, wherein the glass material is a quartz glass.

10. The fluid treatment apparatus according to claim 7, wherein the light source is mounted inside a transparent-walled sleeve which extends through the fluid flow passage.

11. The fluid treatment apparatus according to claim 10, wherein the layer relatively adherence-resistant material comprises a tube of said material fitted over said transparent-walled sleeve.

12. The fluid treatment apparatus according to claim 11, wherein the tube of relatively adherence-resistant material comprises a heat-shrinkable tube recovered onto the sleeve.

13. The fluid treatment apparatus according to claim 7, wherein the layer of relatively adherence-resistant material is applied to the transparent wall by spraying.

14. The fluid treatment apparatus according to claim 7, wherein the layer of relatively adherence-resistant material is 15 to 150 nM in thickness.

15. The fluid treatment apparatus according to claim 7, wherein the layer of relatively adherence-resistant material comprises polytetrafluoroethylene (PTFE).

* * * * *